June 5, 1923.
M. L. NORRIS
1,457,745
FRICTION GOVERNING DEVICE
Filed April 18, 1918
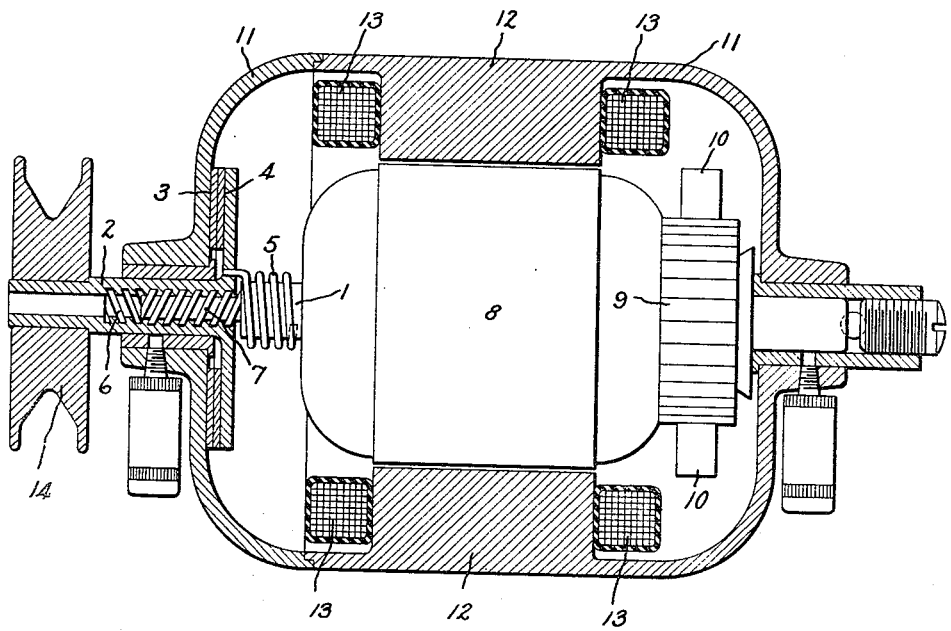
Inventor:
Marvin L. Norris,
by Albert G. Davis
His Attorney.

Patented June 5, 1923.

1,457,745

UNITED STATES PATENT OFFICE.

MARVIN L. NORRIS, OF FORT WAYNE, INDIANA, ASSIGNOR TO GENERAL ELECTRIC COMPANY, A CORPORATION OF NEW YORK.

FRICTION-GOVERNING DEVICE.

Application filed April 18, 1918. Serial No. 229,319.

*To all whom it may concern:*

Be it known that I, MARVIN L. NORRIS, a citizen of the United States, residing at Fort Wayne, in the county of Allen, State of Indiana, have invented certain new and useful Improvements in Friction-Governing Devices, of which the following is a specification.

My invention relates to a friction governing device for maintaining the speed of an electric motor which is not inherently self regulating, at a substantially constant value.

My invention has for its object a novel arrangement and construction of parts, which when applied to maintaining the speed of an electric motor constant, renders it possible to use a series motor, which is inherently a variable speed motor. A series motor is most satisfactory under certain conditions as it will operate on both alternating and direct current circuits and has a good starting torque.

The various features of novelty which characterize my invention are pointed out with particularity in the claims annexed to and forming a part of this specification. For a better understanding of my invention, reference may be had to the following description taken in connection with the accompanying drawing, in which the single figure shows a variable speed electric motor embodying my invention.

In the drawing, the shaft 1 of a variable speed electric motor has applied thereto a friction governing device comprising a torque transmitting member 2 in operative relation to the shaft and arranged for longitudinal movement relative thereto, a friction brake comprising friction members 3 and 4, resilient means in the form of a spring 5 connecting the shaft 1 with the torque transmitting member 2, and means responsive to the torque on the torque transmitting member for varying the pressure between the friction members 3 and 4. The torque transmitting member 2 is shown in the form of a sleeve having a spiral thread 6 engaging with a spiral thread 7 on the shaft 1. The pressure between the friction members 3 and 4 is varied in response to the torque on the members 2 through the agency of these spiral threads as will be explained more fully hereinafter.

The variable speed electric motor shown comprises an armature 8 having a commutator 9 on which brushes 10 bear. The armature is mounted on the shaft 1. The motor has a frame 11 and field poles 12 provided with windings 13 which may be connected in series with the armature 8. Such a motor has a variable speed characteristic and may be operated on either alternating or direct current circuits.

One of the friction members 3 is mounted on the frame 11 and the other member 4 forms a flange on the sleeve 2. A pulley 14 is fastened on the sleeve 2. The spring 5 is a spiral spring surrounding the shaft 1 and having one end connected to the shaft 1, the other end being connected to the torque-transmitting member 2.

The operation of the friction governing device to maintain the speed of the variable speed electric motor shown in the drawing substantially constant is as follows: When the motor is at rest and no current is supplied thereto, the spring 5 causes the friction members 3 and 4 to come into firm engagement with one another. The threads 6 and 7 on the shaft and sleeve are in such a direction that the counter torque of a load on the pulley 14 tends to screw the sleeve 2 onto the shaft 1 and thus partially release the engagement between the friction members 3 and 4. If there is a heavy load on the pulley, the sleeve will be screwed back so far that there would be practically no engagement between the friction members. With no load on the pulley, the sleeve will be screwed in the other direction so as to cause the friction members to engage and thus put a friction load on the motor, the amount of this load depending upon the strength of the spring 5. With loads intermediate no load and a heavy overload, the friction members will be caused to move apart sufficiently to lighten the friction load on the shaft 1 over that at no load. It will thus be seen that my friction governing device will tend to maintain a substantially constant load on the motor shaft, divided between the load on the pulley 14 and that due to the friction between the friction members 3 and 4. With a varying load on the pulley, the counter torque is transferred from the sleeve 2 to the friction device or from the friction device to the sleeve 2, depending upon whether the load is decreasing or increasing, and again tend to maintain a constant load on the motor shaft. The result of maintaining constant load on the motor is the maintenance of practically constant speed of the sleeve 2 and the pulley 14.

I aim in the appended claims to cover all modifications of my invention which do not depart from the spirit and scope thereof.

What I claim as new and desire to secure by Letters Patent of the United States, is:—

1. In combination, a variable speed electric motor, a shaft driven thereby, a torque transmitting member in operative relation to said shaft, a friction brake comprising friction members in operative relation to said torque transmitting member, resilient means connecting said shaft and said torque transmitting member, and means responsive to the torque on the torque transmitting member for varying the pressure between said friction members and thereby maintain the speed of said shaft substantially constant.

2. In combination, a variable speed electric motor, a shaft driven thereby, a torque transmitting member in operative relation to said shaft and arranged for longitudinal movement relative thereto, a friction brake comprising friction members in operative relation to said torque transmitting member, resilient means connecting said shaft and said torque transmitting member, and means responsive to the torque on the torque transmitting member for varying the pressure between said friction members and thereby maintain the speed of said shaft substantially constant.

3. In combination, a variable speed electric motor, a shaft driven thereby, a torque transmitting member in operative relation to said shaft and arranged for longitudinal movement relative thereto, a friction brake comprising friction members in operative relation to said torque transmitting member, a spiral spring surrounding said shaft and having one end connected to said shaft and the other end connected to said torque transmitting member, and means responsive to the torque on the torque transmitting member for varying the pressure between said friction members and thereby maintain the speed of said shaft substantially constant.

4. In combination, a variable speed electric motor, a shaft driven thereby, a sleeve member mounted on said shaft for longitudinal movement relative thereto, a friction brake comprising friction members in operative relation to said sleeve, resilient means connecting said shaft and said sleeve member, and means responsive to said torque on the sleeve member for varying the pressure between said friction members and thereby maintain the speed of said shaft substantially constant.

5. In combination, a variable speed electric motor, a shaft driven thereby, a sleeve member mounted on said shaft for longitudinal movement relative thereto, a friction brake comprising friction members in operative relation to said sleeve, a spiral spring surrounding said shaft and having one end connected to said shaft and the other end connected to said sleeve member, and means responsive to the torque on the sleeve member for varying the pressure between said friction members and thereby maintain the speed of said shaft substantially constant.

6. In combination, a variable speed electric motor, a shaft driven thereby and provided with a spiral threaded portion, a sleeve member mounted on said threaded portion for longitudinal movement thereof and rotary movement therewith, a friction brake comprising friction members in operative relation to said sleeve member, and resilient means connecting said shaft and said sleeve member.

7. In combination, a variable speed electric motor, a shaft driven thereby and provided with a spiral threaded portion, a sleeve member mounted on said threaded portion for longitudinal movement thereof and rotary movement therewith, a friction brake comprising friction members in operative relation to said sleeve member, and a spiral spring surrounding said shaft and having one end connected to said shaft and the other end connected to said sleeve member.

In witness whereof, I have hereunto set my hand this 15th day of April, 1918.

MARVIN L. NORRIS.